May 14, 1957  A. J. HULSEBOSCH ET AL  2,792,345
METHOD FOR INFILTRATION OF TRACE MATERIAL
Filed May 25, 1953

INVENTORS
ALBERT J. HULSEBOSCH
and DALE W. KAUFMANN
BY

Beau, Brooks, Buckley & Beau,
ATTORNEYS.

United States Patent Office 2,792,345
Patented May 14, 1957

2,792,345

METHOD FOR INFILTRATION OF TRACE MATERIAL

Albert J. Hulsebosch, Millburn, N. J., and Dale W. Kaufmann, Buffalo, N. Y., assignors to International Salt Company, Scranton, Pa.

Application May 25, 1953, Serial No. 357,306

3 Claims. (Cl. 210—62)

This invention relates to improved method for infiltration of trace material liquids in accurately proportioned amounts, and more particularly to improved methods and means for accurately metering the addition of relatively small or "trace" amounts of chemicals or other solute substances into water or other solvent liquids.

For example, one useful application of the method and means of the invention is in connection with the problem of introducing corrosion-inhibiting chemicals into industrial water or process brine supplies, either apart from or concomitant with introduction of another solute substance into the solvent liquid. A specific example of such an application of the present invention is in connection with the provision of a block of salt used as means for replenishment of the salt supply in a brine circulating system or brine generating system, such as in connection with water softeners, meat packing plant spray deck cooling systems, etc.

Still another example may be found in provision of salt blocks adapted to be disposed in building roof gutters as a means of preventing ice-clogging thereof during the winter season; such salt blocks thereby functioning to automatically prevent ice accumulation in the gutters but at the same time thereby introducing metal-corrosive brine into the melting ice liquid. To offset the corrosive action thereof, in accord with the present invention, such blocks are fabricated to contain requisite quantities of corrosion-inhibiting chemical in uniformly dispersed condition throughout the blocks, whereby such corrosion-inhibitors are released into the gutter liquid so as to thereby avoid any metal corrosion effects as will be explained hereinafter.

Another application of the method and means of the present invention may be provided in connection with the problem of introducing tooth decay-deterring fluorine compounds or the like into community drinking water supplies. Such uses of fluorine compositions are based upon the premise that people consume, within reasonable range, average amounts of drinking water per day, and that addition of fluorine compounds to their daily diet in small amounts is desirable. However, as a practical matter, in accord with methods of the prior art it has been found to be most difficult to introduce the fluorine compounds into community drinking water supplies in the requisite, accurately controlled, small or "trace" amounts. The present invention provides an improved method and means for introducing such chemical supplies into a drinking water system, among many other possible uses thereof, as will be fully understood upon more detailed explanation of the invention.

The invention provides a relatively simple yet highly efficacious method and means for the purposes aforesaid. Broadly stated, the invention contemplates initial dispersion of the "trace" material throughout blocks of vehicle or matrix substance having a suitable dissolution rate within the solvent liquid; the vehicle substance being so firmly compacted and the "trace" material being so discontinuously dispersed throughout, that the rate of introduction of the "trace" material into the solvent liquid is at all times a function of the rate of dissolution of the matrix substance. Furthermore, the invention contemplates that the blocks aforesaid are so shaped and dimensioned, and so disposed in the solvent liquid as to provide, substantially throughout the useful lives of the blocks, a substantially constant solvent contact total area; whereby the rate of "trace" material introduction into the solvent liquid may be accurately and uniformly controlled through use of such blocks of the invention while requiring no expert attention or skilled labor in connection with the solvent treating operation. The above objects and advantages of the invention will be more fully understood when considered in connection with the following, more detailed, explanation.

Figure 1:
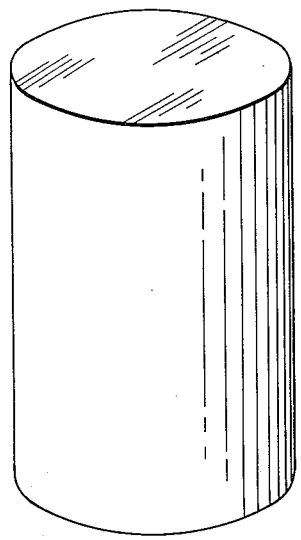
Fig. 1 is a perspective view of one practical physical form of trace material containing block means of the present invention.
Figure 2:
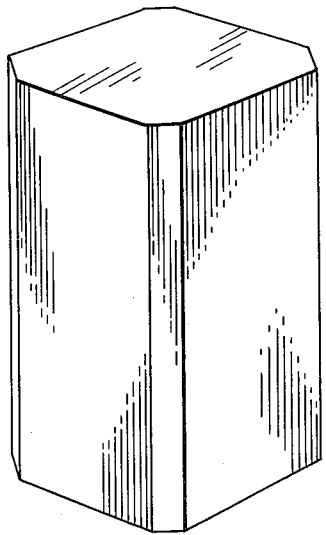
Fig. 2 is a perspective view of another suitable form thereof.

As stated hereinabove, the invention contemplates generally initial dispersion of the trace material throughout a compacted block of a material which will dissolve in the solvent liquid to be treated. The invention contemplates that the material comprising the matrix body or "vehicle" portion of the block device may be of any suitable chemical form so as to be unobjectionable when dissolved into the solvent stream being treated. For example, common salt comprising essentially sodium chloride with minor impurities, will in many cases comprise a satisfactory medium for this purpose. It is relatively inexpensive and readily available and dissolves in water at constant rate, and in many cases its presence in solution would not be objectionable. In fact, in many cases of use the presence of brine in the end solution will often be advantageous, such as for example, in connection with the problem of introducing metal corrosion inhibiting substances into brine solutions such as are used in connection with various industrial refrigeration mechanisms and the like. In any case the physical form of the block of the vehicle material may be selected to suit various manufacturing processes and/or useful products; and as illustrated in Figs. 1 and 2 for example in the drawing they may be fabricated relatively easily and inexpensively in cylindrical, prismatic or any other desired form. In any case, in accord with the concept of the present invention it is prerequisite that the trace material and the vehicle material in the blocks of the invention must be so relatively proportioned that the trace materials are thoroughly and uniformly dispersed in discontinuous manner throughout the vehicle material, as is shown for example in Fig. 3.

Figure 3:
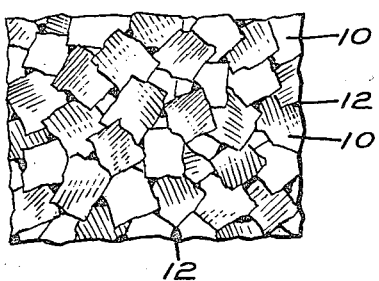
Fig. 3 is a fragmentary sectional view, on a magnified scale, through a typical block device of the present invention, showing the manner of dispersion of the "trace" material therethrough.

Fig. 3 is an illustrative sectional view, on greatly magnified scale, made from microphotographs of sections of blocks of the invention wherein the vehicle material consists of salt and the trace material consists of a complex polyphosphate chemical having the property of inhibiting corrosion of ferrous metal parts. In Fig. 3 the numeral 10 designates the salt crystals, while numeral 12 designates the trace material inclusions. It is to be particularly noted that finely divided "trace" materials may readily be mixed into granular salt particles, and then the mixture compacted by application of suitable pressure into dense and coherent block form, whereby salt blocks so produced are hard and dense throughout. As stated before, it is essential in accord with the concept of the present invention that the trace material particles in the solid block fabrications shall be uniformly distributed throughout the block yet individually segregated as illustrated for example in Fig. 3. This is because the rate of delivery of the trace material into the solvent solution is then a function only of the rate of dissolution of the vehicle material. Otherwise, if for example the "trace" material were continuously distributed throughout the matrix and inclined to dissolve at a more rapid rate than the vehicle material in a block of this type, the solvent action on the block would result in honeycombing of the block to such extent as to permit free percolation of solvent liquid through the block, with consequent premature release of "trace" material prior to complete dissolution of the block. It is by virtue of this feature of the invention that control of the rate of delivery of the trace material into the solvent solution is maintained throughout the useful life of the block of the invention.

Thus, it will be appreciated for example that salt blocks fabricated in accord with the present invention and having inclusions of corrosion-inhibiting substances therein may be advantageously employed as means for feeding salt supplies into brine circulating systems such as are commonly used for example in connection with various industrial refrigerating and/or air conditioning devices.

In such cases the salt blocks may be simply placed in the path of the circulating brine solution so that whenever the brine strength tends to weaken, fresh salt supply will be picked up from the blocks while at the same time the proper quantities of corrosion-inhibiting substances will be introduced into the circulating brine system so as to thereupon retard any tendency of the brine solution to corrode the metal parts of the apparatus with which the brine solution comes in contact. Furthermore, for the reasons explained hereinabove, it will be understood that the corrosion-inhibitor chemicals will in the case of the present invention be uniformly released concomitant with the dissolution of the salt block substance into the brine solution; as distinguished from prior art methods whereby salt is simply dumped freely into the brine solution from time to time along with accurately measured minute quantities of corrosion inhibitor chemicals. Such methods require the most expert attention and skilled labor in order to produce desired results.

Similarly, a salt block of the present invention as just referred to hereinabove may be readily fabricated to contain a sufficient supply of corrosion-inhibiting chemical substances therein so that such blocks are adapted to be placed within building roof gutters or the like during the winter season, so as to prevent ice accumulation in the gutters. Incidental to dissolution of the salt substances of such blocks sufficient quantities of corrosion-inhibiting substance will be liberated to also enter the water streams flowing through the gutters and into the down spouts; thereby protecting such metal structures from corrosion effects such as would otherwise be experienced in the event that salt alone were used for the purpose.

Figure 4:
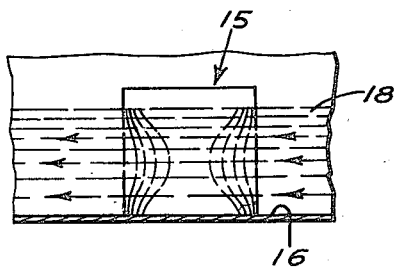
Fig. 4 is a fragmentary sectional view, partly in diagrammatic form, of a solvent liquid container employing a "trace" material delivery block in accord with the present invention.

Fig. 4 illustrates by way of example a typical use of one of the blocks of the invention. Thus, as shown in Fig. 4 a block designated generally by the numeral 15 is shown as being disposed to stand in upright position upon the bottom plate portion of a trough or vat or launder or gutter device or the like, as indicated at 16; the solvent liquid or water stream flowing therethrough being indicated at 18.

The block 15 comprises a firmly compacted body of salt or other suitable matrix material which is so dense as to substantially eliminate any interstices therein, and to thereby provide a substantially solid mass of predetermined shape and dimensions whereby precisely predetermined surface areas of contact with the circulating liquid in the sump are provided. Furthermore, the invention contemplates preselection of the geometric form and dimensional specifications of the aforesaid block to be of such nature as to insure throughout the block leaching operation of the solution as it circulates around the block when disposed in the sump, a constantly changing shape but a substantially unchanged solution-to-block total contact area, throughout the life of the block. Thus, a uniform rate of block dissolution in response to a given rate of solution circulation through the sump is obtainable in the case of the present invention.

More specifically, in accord with the present invention a block such as is designated 15 in Fig. 4 of the drawing may be fabricated for example by compressing a relatively large volume of granular salt particles within a compression die device; thus subjecting the salt material to such pressure as to cause the particles thereof to crush and merge together into an extremely hard and solidly compacted block form having substantially no interstices thereinto such as would otherwise permit entrance of solution thereinto and consequent formation of solution channels interiorly of the mass. Thus, fluctuation to undesirable degree of the overall contact surface area between the block material and the circulating solution as the operation proceeds, is avoided.

In accord with the present invention one or more such salt blocks as are illustrated at 15 in the drawing may be simply placed in the sump 16 so that a brine solution circulates therearound. The cross-sectional dimensions of the salt blocks 15 and the depth of the brine solution in the vat and the number of salt blocks disposed at any one time in the vat would be regulated in accord with the rate of brine solution circulation, so as to provide the required rate of salt dissolution from the solution contact surfaces of the blocks. It is a particular feature of the present invention that as the circulating brine operates to gradually leach away the brine contact surface portions of the blocks this leaching process takes place against the submerged side wall portions of the block. Consequently, as these immersed side wall surfaces are leached away (thereby tending to reduce in perimetral dimensions), the leaching process progresses deeper and deeper into the block intermediately of the upper and bottom end portions thereof, so that the block assumes progressively slimmer hour-glass configurations as shown in Fig. 4. This action takes place because of the fact that the bottom surface of the block sets against the bottom of the sump 16 and is thereby insulated from any substantial brine solution circulation thereagainst, while the upper end portion of the block, substantially throughout its useful life, protrudes above the brine solution in the sump and therefore is not exposed to leaching action by the brine in the sump.

Thus, whereas any submerged porous mass of salt, as in the prior art, will immediately commence to dissolve to present progressively smaller surface areas for solvent contact; in the case of the present invention there is maintained a substantially constant solvent contact area throughout modification of the block shape as from the solid line form shown in Fig. 4 to the broken line forms shown therein. This hour-glass form continues to develop until such time as the block becomes substantially consumed, when the final remnants thereof crumble into the brine and participate in the brine strengthening process. This action is facilitated because the hour-glass type leaching action against the side walls of the block causes the lower portion of the block to assume the role of a pedestal for support of the upper portion in the attitude shown in Fig. 4, until such time as the block is substantially dissolved away.

Because the "trace" material or materials of the block are disseminated throughout the compacted matrix material of the block, the trace material becomes exposed to and dissolves into the solvent liquid at precisely regulated and uniform rate throughout the life of the block. Thus, it will be appreciated that the invention provides for example a method and means for accurately metering minute quantities or so-called "trace" materials into liquid bodies. The method of the invention does not require the use of delicate or expensive measuring or metering or feeding apparatii or the use of skilled workmen; and at all times the progress of delivery of the "trace" material into the solvent liquid is capable of visible check.

Whereas the invention has been described and illustrated in detail hereinabove in connection with the use of sodium chloride salt as the vehicle material for metering delivery of the "trace" materials, it will of course be appreciated that any other suitable soluble substance or substances may be used in lieu of salt as the vehicle material. In any case the vehicle material will be preselected with regard to economic considerations as well as the desired rate of solution and the compatibility of the vehicle substance with the "trace" material and with the solvent solution. A further advantage is that the invention operates to avoid over and under dosages of the "trace" materials in the solution.

We claim:

1. The method of introducing at a substantially uniform regulated rate a trace material into a liquid solvent comprising, first mixing fragments of such trace material in finely disseminated form throughout a mass of matrix material soluble in said liquid solvent, next compacting said mixture under pressure to provide a block having substantially no voids therein with said trace material being uniformly dispersed throughout the compacted block in discontinuous form, then standing said block in a substantially constant depth flowing stream of said liquid solvent with the top portion of said block disposed above said stream and with the bottom of said block substantially insulated from said stream, whereby said stream of liquid solvent flows against substantially only the side surfaces of said block and dissolves said block at the liquid contact side surfaces thereof into progressively changing hour-glass shaped forms presenting to the liquid solvent a substantially constant total liquid contact area substantially throughout the life of the block, whereby said trace material fragments become successively exposed to said liquid solvent and are metered into solution therewith at a substantially uniform overall rate.

2. The method of metering a trace material into a liquid solvent at a substantially uniform regulated rate comprising, first mixing said trace material in a matrix material soluble in said liquid solvent with said trace material being substantially uniformly dispersed through the resultant mixture in discontinuous form, next compacting said mixture under pressure to provide a block having substantially no voids therein, then disposing said block in a substantially constant depth stream of said liquid solvent with the top and bottom surfaces of said block being substantially out of dissolution contact with said solvent, whereby said stream of liquid solvent dissolves said block primarily only at the liquid contact side surfaces thereof and said block presents to the liquid solvent a substantially constant total liquid contact area throughout the life of the block, whereby said trace material becomes exposed to and enters into solution with said liquid solvent at a substantially uniform rate.

3. The method of introducing a trace material into a liquid solvent at a substantially uniform rate comprising, first mixing said trace material in a mass of matrix material soluble in said liquid solvent with said trace material being substantially uniformly distributed through the mass in discontinuous form, next compacting said mixture under pressure to provide a block having substantially no voids therein, then placing said block in a substantially constant depth flowing stream of said liquid solvent with substantially only the side surfaces of said block in dissolution contact with said liquid solvent, whereby as said stream of liquid solvent dissolves said block at the liquid contact surfaces thereof said block presents to said liquid solvent a substantially constant total liquid contact area substantially throughout the life of the block, and controlling said stream to move at a preselected rate.

References Cited in the file of this patent

UNITED STATES PATENTS

| | | |
|---|---|---|
| Re. 23,583 | Eilerts | Nov. 18, 1952 |
| 1,408,535 | Ressler | Mar. 7, 1922 |
| 2,023,459 | Bachman | Dec. 10, 1935 |
| 2,097,092 | Bachman | Oct. 26, 1937 |
| 2,521,802 | Otto | Sept. 12, 1950 |
| 2,641,537 | Dunn et al. | June 9, 1953 |